(12) United States Patent
Yagi et al.

(10) Patent No.: US 12,268,308 B2
(45) Date of Patent: Apr. 8, 2025

(54) CHAIRS WITH MACHINE WASHABLE AND INTERCHANGEABLE COVERS THAT SIMULATE PERMANENT UPHOLSTERY

(71) Applicant: Ruggable LLC, Gardena, CA (US)

(72) Inventors: Jayson Yagi, Santa Ana, CA (US); Max Sieck, Los Angeles, CA (US); Robert Westphal Vera, New York, NY (US); William Stanhope St. Amant, Venice, CA (US)

(73) Assignee: Ruggable LLC, Gardena, CA (US)

( * ) Notice: Subject to any disclaimer, the term of this patent is extended or adjusted under 35 U.S.C. 154(b) by 226 days.

(21) Appl. No.: 18/252,528

(22) PCT Filed: Nov. 12, 2021

(86) PCT No.: PCT/US2021/059056
§ 371 (c)(1),
(2) Date: May 10, 2023

(87) PCT Pub. No.: WO2022/104004
PCT Pub. Date: May 19, 2022

(65) Prior Publication Data
US 2023/0414001 A1 Dec. 28, 2023

Related U.S. Application Data

(60) Provisional application No. 63/113,335, filed on Nov. 13, 2020.

(51) Int. Cl.
*A47C 31/11* (2006.01)
*A47C 7/02* (2006.01)
(Continued)

(52) U.S. Cl.
CPC ............ *A47C 7/0213* (2018.08); *A47C 31/11* (2013.01); *B60N 2/60* (2013.01); *B64D 11/0647* (2014.12)

(58) Field of Classification Search
CPC ..... A47C 31/11; A47C 31/113; A47C 31/116; A47C 7/0213; B60N 2/60; B60N 2/6009; B60N 2/6027; B64D 11/0647
See application file for complete search history.

(56) References Cited

U.S. PATENT DOCUMENTS 1,698,968 A * 1/1929 Rubenstein ............ A47C 31/11
297/218.1
1,825,909 A * 10/1931 Levi ........................ A47C 31/11
297/229

(Continued)

*Primary Examiner* — Syed A Islam
(74) *Attorney, Agent, or Firm* — Hawkinson Yang LLP

(57) ABSTRACT

Chairs are provided as frames and fabric coverings that operate together as an integrated system so that the chairs have the appearance of being permanently upholstered even while the fabric coverings can be easily detached and re-attached, such as for washing or replacement. The fabric coverings attached using a variety of attachment mechanisms including zippers, flexible loops and grooved wheels, and snap-in buttons. The detachability of the fabric coverings of the chairs allows them to be washed as frequently as desired by a consumer, using consumer washing machines, rather than requiring expensive cleaning by a specialty upholstery cleaner. These covers also allow for changing the pattern, color, and texture of the chair as frequently as the consumer desires, at a cost that is a fraction of the price of a new chair or reupholstering a chair.

11 Claims, 15 Drawing Sheets

(51) Int. Cl.
*B60N 2/60* (2006.01)
*B64D 11/06* (2006.01)

(56) References Cited

U.S. PATENT DOCUMENTS

| | | | | |
|---|---|---|---|---|
| 2,531,047 | A * | 11/1950 | Holsinger | A47C 31/11 297/227 |
| 2,937,695 | A * | 5/1960 | Coggin | A47C 31/11 297/227 |
| 4,838,610 | A * | 6/1989 | Perrin | A47C 31/11 297/228 |
| 5,338,092 | A * | 8/1994 | Wiltsey | A47C 31/11 297/218.4 |
| 5,664,831 | A * | 9/1997 | White | A47C 31/11 297/228.11 |
| 6,345,866 | B1 * | 2/2002 | Jackson | B60N 2/6054 297/229 |
| 6,398,301 | B1 * | 6/2002 | Illulian | A47C 31/11 297/228.1 |
| 6,409,264 | B1 * | 6/2002 | Palmer | A47C 31/11 297/229 |
| 6,659,550 | B2 * | 12/2003 | Hackett | A47C 31/11 5/500 |
| 7,360,834 | B2 * | 4/2008 | Miller | A47C 31/11 297/229 |
| 8,465,093 | B2 * | 6/2013 | Janowski | B60N 2/58 297/229 |
| 8,851,567 | B2 * | 10/2014 | Nguyen | D03D 11/02 297/218.4 |
| 9,295,339 | B2 * | 3/2016 | Hampton | A47C 31/11 |
| 10,681,997 | B1 * | 6/2020 | Rigas | A47C 31/11 |
| 2003/0122411 | A1 * | 7/2003 | Chambers | A47C 31/11 297/228.13 |
| 2008/0150334 | A1 * | 6/2008 | Callaghan | A47C 31/11 297/218.3 |
| 2011/0260512 | A1 * | 10/2011 | Renda | A47C 31/11 297/219.1 |
| 2012/0175926 | A1 * | 7/2012 | McKinney | A47C 31/11 297/220 |
| 2019/0110600 | A1 * | 4/2019 | Durand | A47C 27/086 |
| 2020/0128969 | A1 * | 4/2020 | Strasser | A47C 1/11 |
| 2023/0174237 | A1 * | 6/2023 | Harcup | B64D 11/0647 244/118.6 |
| 2023/0218095 | A1 * | 7/2023 | Youngerman | A47C 31/11 297/228.1 |
| 2023/0309710 | A1 * | 10/2023 | Chen | A47C 31/11 297/228.13 |

* cited by examiner

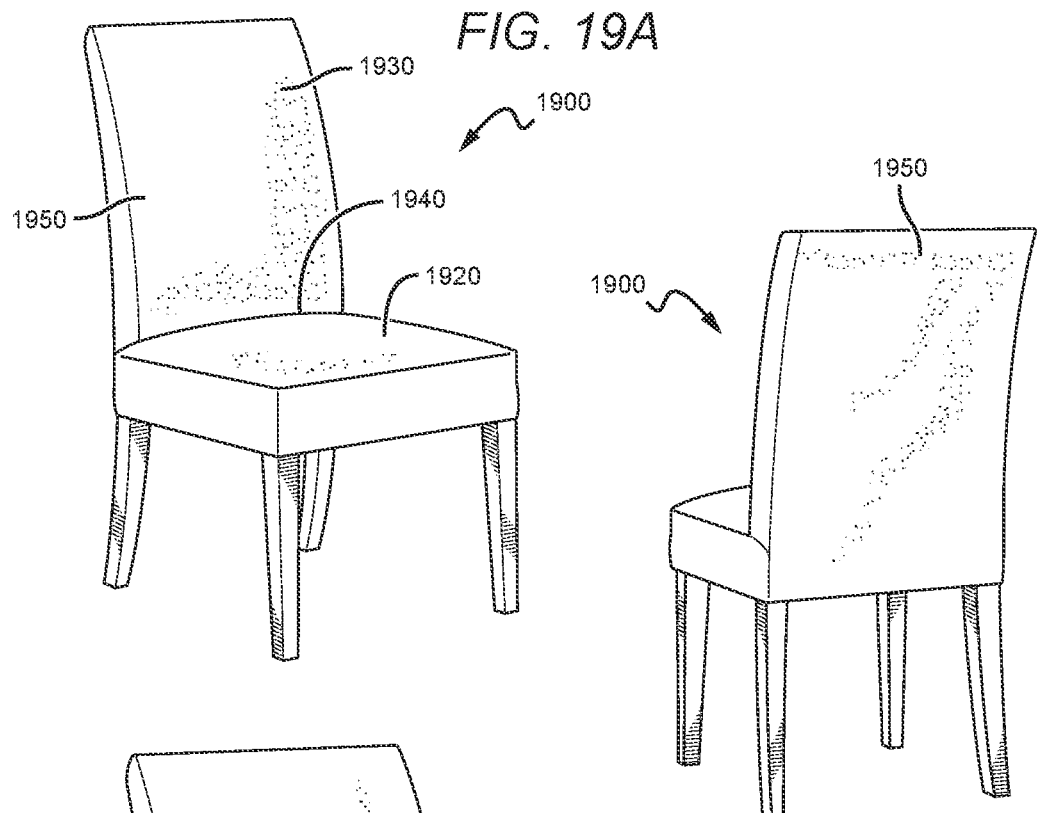
FIG. 19A
FIG. 19B
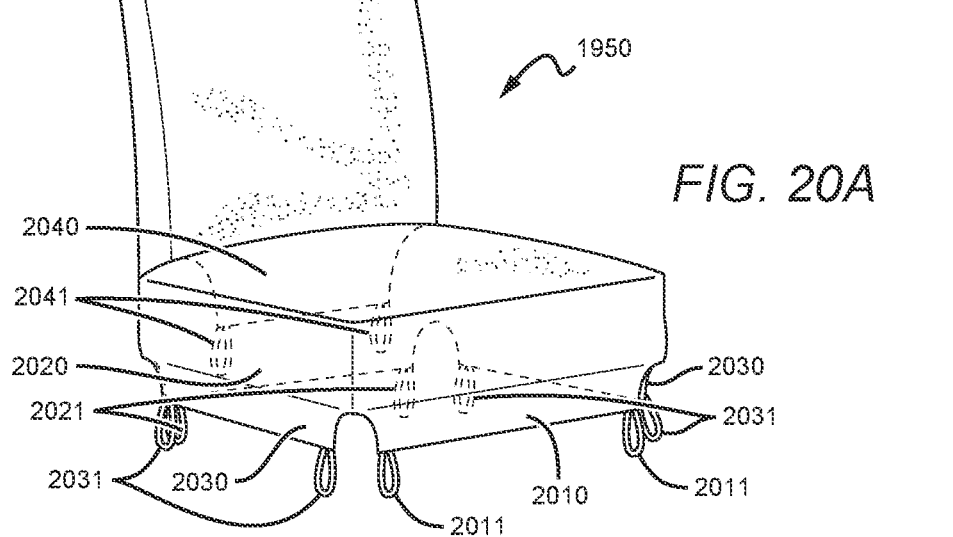
FIG. 20A

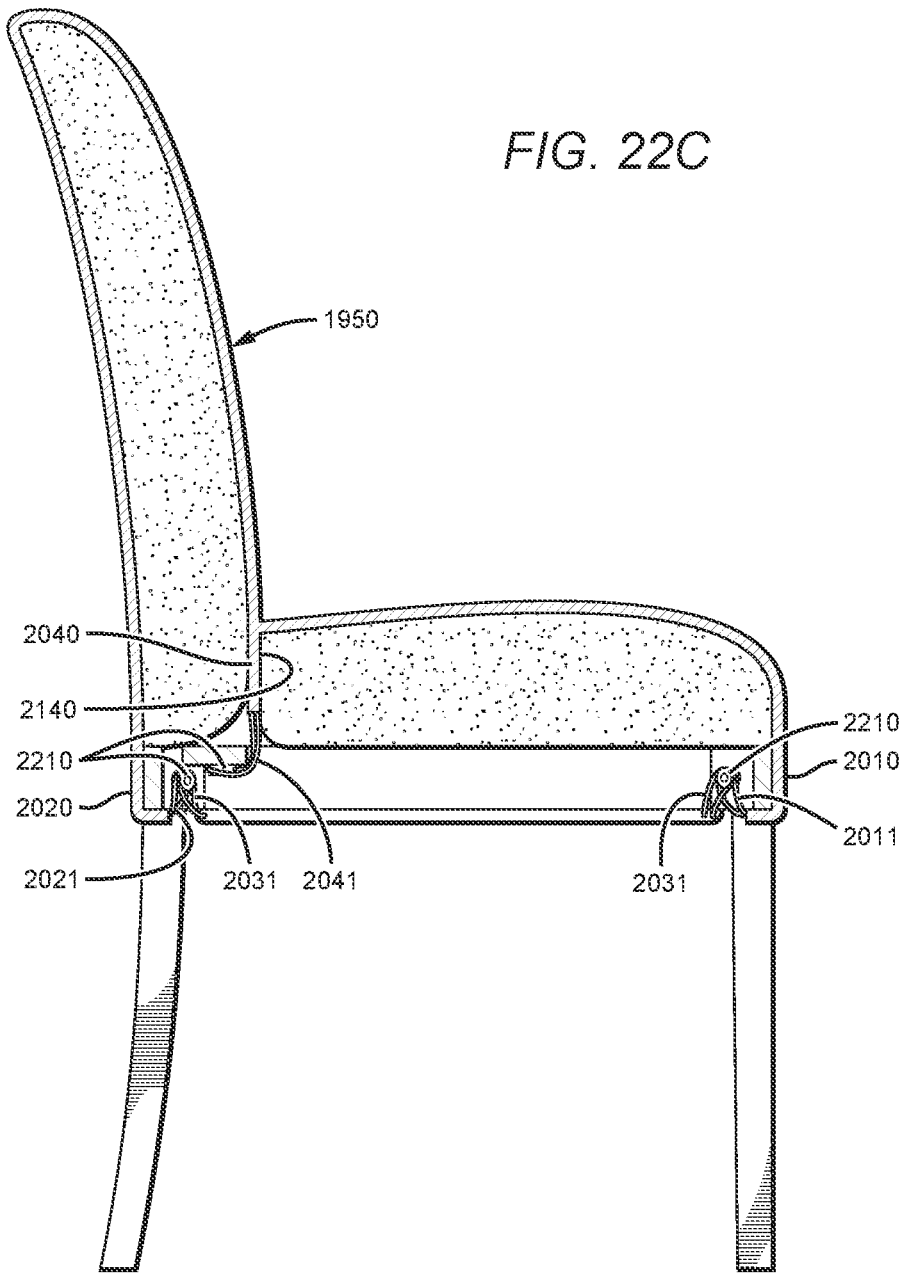

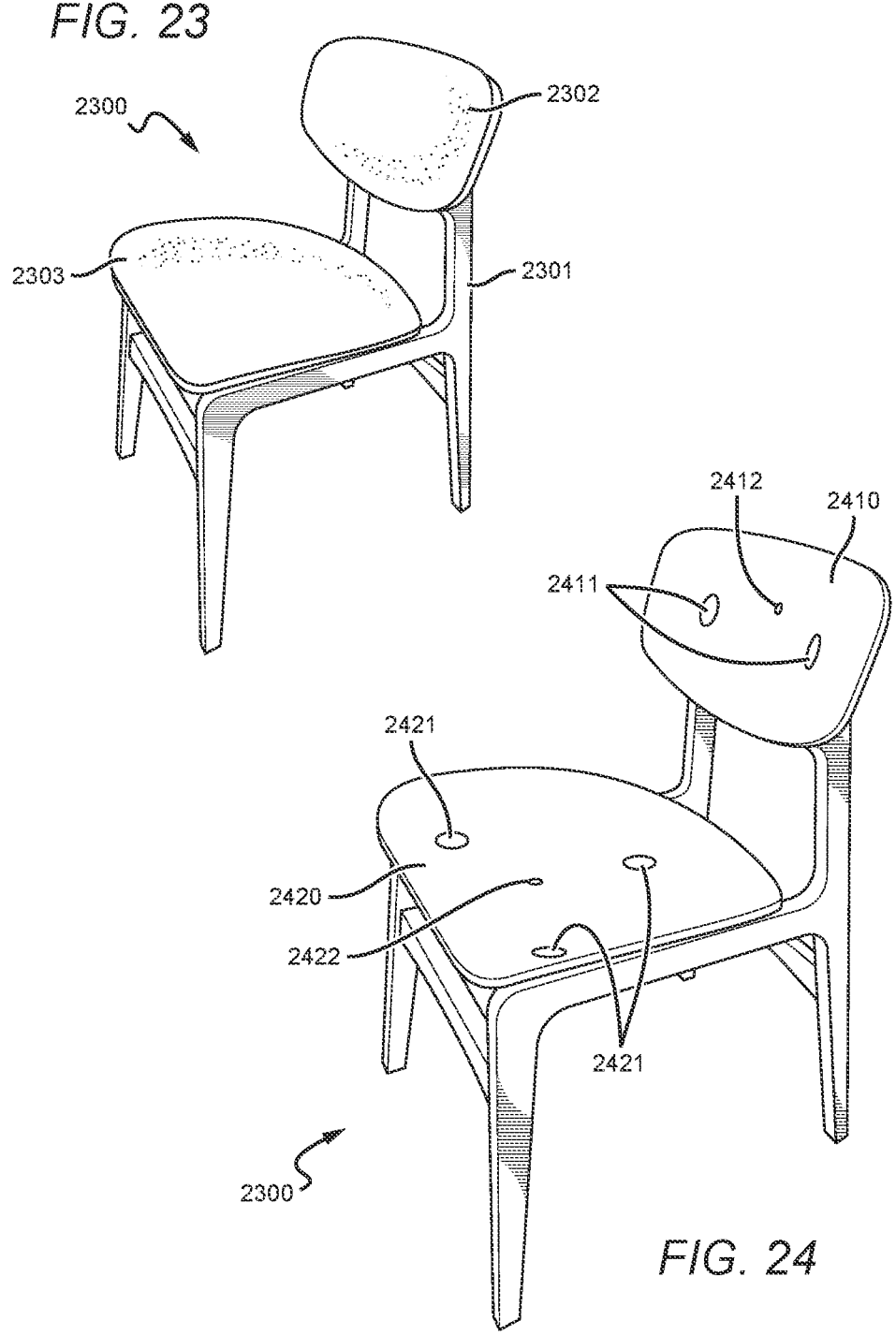

CHAIRS WITH MACHINE WASHABLE AND INTERCHANGEABLE COVERS THAT SIMULATE PERMANENT UPHOLSTERY

TECHNICAL FIELD

This disclosure relates generally to chairs and, more particular, to chairs comprising frames and fabric coverings that operate together as an integrated system so that the chairs have the appearance of being permanently upholstered even while the fabric coverings can be easily detached and re-attached, such as for washing or replacement.

BACKGROUND ART

This disclosure aims to improve on conventional upholstered chairs and conventional slipcovers for chairs.

Upholstered chairs are preferred by many people due to their comfort and aesthetically pleasing designs. Conventional upholstered chairs are typically covered by a fabric, leather, or other material that is permanently affixed to the underlying frame, often made of wood, such as by stitching or stapling. The cover cannot easily be removed, and once removed, cannot easily be re-attached. Accordingly, it is not easy for a person to clean the chair if it is stained. One would usually need to apply a special upholstery cleaning solution to the stain and try to rub out the stain by hand. In the case of a more severe stain, it would be necessary to take the chair to a professional cleaner, which many people would consider to be too costly relative to the value of the chair. In the case of a severe stain, or if the cover is torn or otherwise damaged, the chair would need to be reupholstered. Many people simply discard their chairs once they are stained or damaged rather than to incur such costs, which is wasteful and detrimental to the environment.

Removable slipcovers have been made to fit over chairs (and other furniture) to provide some protection against staining. However, conventional slipcovers are typically not form-fitted or visually attractive, and detract significantly from the aesthetic appeal of the chairs.

DISCLOSURE OF INVENTION

This disclosure relates to chairs comprising an integrated system of frames and fabric coverings that can be detached and re-attached easily by a person without the use of tools.

The below describes various embodiments that comprise one or more features considered to be inventive on their own or in combination. The disclosure is not intended to be limited to the specific embodiments described herein; for instance, various aspects of different embodiments could be used together without departing from the scope of the disclosure.

FIRST EMBODIMENT

FIGS. 1 through 12 depicts several views of a lounge chair 100 in a transitional style.

FIG. 1 depicts a perspective view of the chair 100. The chair comprises a chair body 101, a seat cushion 102, and a back cushion 103.

FIG. 2 depicts the same perspective view of the chair without the seat cushion and back cushion, which are easily removed. The chair base 202 supports the seat cushion 102 and the weight of a person sitting in the chair. The backrest 203 supports the back cushion and allows a person to lean back in the chair. The right panel 204 and left panel 205 form the sides of the chair. Chair legs 206 elevate the chair above the floor. Although the chair 100 is depicted as having four legs, the chair may be made with a different number of legs, such as a single pedestal-like leg, or even no legs at all. The same is true for all embodiments described in this disclosure.

Traditionally, lounge chairs similar in style to chair 100 have been difficult to wash. Such chairs are typically covered by a fabric, leather, or other material that are permanently affixed to the underlying wood frame, such as by stitching or stapling. The cover cannot easily be removed, and once removed, cannot easily be re-attached. Aftermarket slipcovers are available for covering the chairs to protect against staining, but these slipcovers are typically not form-fitted and are aesthetically detrimental, such as by giving a disheveled or rumpled look to the furniture.

The lounge chair 100 has several functional features that help overcome the above-described problems that are associated with conventional designs. For one, the chair has a removable outer cover.

FIGS. 3A and 3B show perspective views of chair 100 with its outer cover removed. With its outer cover removed, chair 100 remains covered by an inner cover 301 made of a waterproof or water-resistant material such as polyurethane or vinyl. Conventional indoor chairs typically do not have inner linings that are waterproof or water-resistant, such that when significant spills or stains get onto them. When spills get inside of the foam or filling, they may cause odors and molds that are impossible to remove. Even a professional deep cleaning will not remove the substance from inside the foam or filling. This causes many spills to ruin chairs and then chairs to be discarded. In contrast, the chairs disclosed here can easily be wiped down once the outer cover is taken off.

FIGS. 4A and 4B show perspective views of an outer cover 400 that can be used with chair 100. FIG. 4A shows a front perspective view and FIG. 4B shows a back perspective view. Outer cover 400 is made of fabric or other material, and is designed to form snugly over the body of the chair 100 as shown in FIG. 3A and FIG. 3B. The outer cover may be made of a machine washable material so that it can be washed in a standard consumer washing machine. The outer cover has a front flap 410 and a back flap 420. An elastic material, such as bungee, is sewn into the front flap 410 to form a front right attachment loop 411 and a front left attachment loop 412. Similarly, an elastic material is sewn into the back flap to form a back right attachment loop 421 and a back left attachment loop 422. A hidden zipper 430 is sewn into one side of the outer cover to allow the cover to be loosened so that it can be more easily removed from and placed back on to the chair. While the hidden zipper 430 is shown as being located on the seam on one side of the back of the outer cover between the back and one armrest, the zipper may be located at other parts of the outer cover.

FIG. 5 depicts the outer cover 400, opened up, with the hidden zipper 430 unzipped. Note that while a zipper is depicted, other fasteners may be used instead, such as buttons or hook and loop material.

FIG. 6 depicts the underside 600 of chair 100 with the outer cover 400 removed. Chair legs 206 may be permanently attached to the underside or may be of a screw-in type or other configuration that allows legs to be easily removable by a person. Some consumers may prefer removable legs because damaged legs can be easily replaced, or the existing legs can be replaced with legs of a different style. Grooved wheels 601, which are akin to pulley wheels provide attachment points for the attachment loops 411, 412, 421, and 422 on the outer cover 400.

FIG. 7 depicts the underside 600 of chair 100 with the outer cover 400 attached. Each attachment loop 411, 412, 421, and 422 is stretched and looped around a grooved wheel 601. The elastic of the attachment loops allows the outer cover 400 to be pulled taut over and securely affixed to the chair body 101.

FIG. 8A and FIG. 8B depict a grooved wheel 601 without an attachment loop attached. FIG. 8A shows a top perspective view and FIG. 8B shows a side view of grooved wheel 601. The grooved wheel 601 includes a groove 801 and flared portions 802. When attached, the elastic of each attachment loop loops around the groove 801 and is held in place by the flared portions 802 of the grooved wheel 601. FIGS. 9A and 9B depict a top view and side view of grooved wheel 601 with an attachment loop looped around; these figures show the example of front right attachment loop 411 looped around a grooved wheel 601. Note that while elastic loops and grooved wheels are depicted, other fasteners may be used instead.

FIGS. 10A and 10B depict perspective views of a seat cushion 102. FIG. 10A shows a top perspective view and FIG. 10B shows a bottom perspective view. The seat cushion is covered with an outer cover 1010 made of similar material as the outer cover 400 for the chair body 101. The bottom of the outer cover 1010, corresponding to the bottom of seat cushion 102, has a u-zipper 1011. The u-zipper 1011 allows the outer cover 1010 to be easily removed for washing.

FIG. 10C depicts a perspective view of seat cushion 102 with outer cover 1010 removed. The seat cushion is covered with an inner cover 1020 made of a waterproof or water-resistant material. The inner cover 1020 has two side panels 1021 covered in a mesh material 1022, which may be a polyester mesh. Because waterproof material is airtight, sitting on a cushion with internal waterproof material would normally cause a delay in seat depression, which some people may not like. However, the mesh material 1022 allows for the seat cushion 102 to "breathe" like a normal cushion, so that a person sitting on the cushion 102 would not perceive any meaningful delay in seat depression that would suggest that the cushion is unlike conventional seat cushions. The side panels 1021 of the seat cushion 102 provide a good position for the mesh material because the side panels are relatively less prone to spills than other parts of the cushion. The mesh material may also be placed on more than two of the side panels or on the underside of the cushion.

FIG. 11 depicts a side cross-section view of seat cushion 102. The seat cushion is made of a combination of two types of foam of different level of plushness. The firm, high resilience foam 1101 is arranged at the base of the cushion to support the body weight of the person. The softer foam 1102, which may be memory foam or other foams of different compositions, is arranged in an upper layer which allows the seat cushion to contour to the person's body, providing a more comfortable seated position and removing pressure on femoral and other leg arteries so that a person's leg is less likely to become numb or "fall asleep" in the chair. It has been found that the softer foam layer 1102 works well when it is around two inches thick, but it may be also be made in different thicknesses. In FIG. 11, the firm foam 1101 and softer foam 1102 are depicted as being of equal thickness, but they may also be made of different thicknesses. The combination of foam types provides a desirable balance of support and comfort for a sitting person. Optionally, there may be another thin layer of soft foam below the firm foam 1101, which may be desired depending on the precise design of the chair, to allow the cushion to better adjust to the shape of the chair.

FIG. 12A depicts a perspective view of the top of back cushion 103. The back cushion is covered with an outer cover 1210. FIG. 12B depicts a perspective view of the bottom of back cushion 103 with a u-zipper 1211. Similar to the seat cushion 102, the u-zipper 1211 allows the outer cover 1210 to be easily removed for washing. The back cushion is covered with an inner cover 1220 made of a waterproof or water-resistant material. Similar to the inner cover 1020 for seat cushion 102, the inner cover 1220 may have certain panels, such as its side panels, made of mesh material.

SECOND EMBODIMENT

FIGS. 13 through 16 depict several views of a lounge chair 1300 in a Scandinavian modern style.

FIG. 13 depicts a perspective view of chair 1300. The chair comprises a frame 1310, a seat cushion 1320, and a back cushion 1330. The frame 1310 may be fashioned from wood, metal, or other material.

FIG. 14 depicts a perspective view of chair 1300 with the seat cushion and back cushion removed.

FIG. 15A and FIG. 15B depict perspective views of a seat cushion 1320. FIG. 15A shows a top perspective view and FIG. 15B shows a bottom perspective view. The seat cushion is covered with an outer cover 1510. Like other outer covers discussed in this disclosure, outer cover 1510 may be made of a washable fabric. The bottom of seat cushion 1320 has a u-zipper 1511, which is depicted as partially unzipped in this figure. The u-zipper 1511 allows the outer cover 1510 to be easily removed for washing. The seat cushion is covered with an inner cover 1520 made of a waterproof or water-resistant material, and it may have certain panels, such as its side panels, made of mesh material as described in connection with the first embodiment above. The seat cushion 1320 may be made of foam of different levels of firmness as described in connection with the first embodiment above.

FIG. 16A and FIG. 16B depict perspective views of back cushion 1330. The back cushion is covered with an outer cover 1610. The back of back cushion 1330 has a u-zipper 1611. Similar to the seat cushion, the u-zipper 1611 allows the outer cover 1610 to be easily removed for washing. The back cushion is covered with an inner cover 1620 made of a waterproof or water-resistant material and may have certain panels made of a mesh material.

THIRD EMBODIMENT

The third embodiment relates to improvements on a traditional dining chair in the popular Parsons style. FIG. 17 depicts a conventional Parsons chair 1700. A Parsons chair typically has a cushioned seat 1720 and backrest 1730 covered in fabric upholstery. Such chairs also are typically high-backed and armless. A design element found in many Parsons chairs is the cavity 1740 located at the junction between the seat 1720 and the backrest 1730. In a typical chair of this type, the seat and backrest are separately upholstered and fitted tightly together to form the cavity 1740. In a properly constructed Parsons chair, the tightness of cavity 1740 makes it difficult to clean, which may allow food crumbs and other debris to gather inside the cavity. It is also not easy, and in fact it is practically undoable, for a consumer to remove the fabric covering of the seat and back for washing. Even for conventional chair covers billed as removable and washable, it is not easy for the consumer to take them apart and put them back together, as attachments beyond Velcro and standard zippers are not available in the market.

Parsons chairs are often used in settings where an elegant aesthetic is desired, such as in fine dining establishments and traditional homes. It is important in such settings that the chairs remain clean and well maintained. However, as mentioned, conventional Parsons chairs are typically upholstered and are not easily washable. Additionally, conventional Parsons chairs are prone to have food crumbs and small debris get stuck in the cavity at the junction between the seat and backrest, which is difficult to clean out.

Because conventional Parsons chairs are difficult to clean, it is common for people to place slipcovers over such chairs to prevent them from becoming dirty in the first place. FIG. 18 depicts a Parsons chair with a slipcover 1801. Such slipcovers often detract from the aesthetic appeal of the Parsons chair. Slipcovers often have a rumpled appearance because they have to be loose enough to be able to be slipped over the chair, and the slipcovers are often universal such that they do not fit any single chair well. Also, slipcovers cover over the cavity 1740 between the seat and the backrest that is considered by many people to be an appealing aesthetic element of Parsons chairs. These issues make the use of slipcovers non-ideal in fine dining and traditional situations, as they detract from the reasons why Parsons chairs are often preferred in such contexts.

FIGS. 19 through 22 depict several views of a dining chair 1900 in the Parsons style that does not suffer from the shortcomings of conventional chairs of this style.

FIGS. 19A and 19B depict front and back perspective views of dining chair 1900. From a casual observation, it is indistinguishable from a conventional chair 1700. Chair 1900 has a cushioned seat 1920 and backrest 1930 covered in fabric material. Chair 1900 also has a deep seam 1940 at the junction between the seat 1920 and the backrest 1930, which forms a visible gap between the seat and backrest characteristic of this style of chair The depicted chair 1900 has several functional features that overcome the problems with conventional designs. For one, it has a removable outer cover 1950 that fits over the body of the chair. Unlike the slipcovers used with conventional chairs, the outer cover allows the chair to have a gap between the seat 1920 and backrest 1930 as an aesthetic feature typical of this chair style, as will be explained in more detail below.

FIGS. 20A and 20B depict the outer cover 1950 separate from the chair. FIG. shows a perspective view and FIG. 20B shows a cross-section view of the outer cover 1950. The outer cover has a front flap 2010 with two attachment loops 2011, back flap 2020 with two attachment loops 2021, side flaps 2030 with two attachment loops 2031, and an internal flap 2040 with two attachment loops 2041.

FIG. 21 depicts a perspective view of chair 1900 with the outer cover 1950 removed. A thin opening 2140 located at the junction between seat 1920 and back 1930 allows the internal flap 2040 of the outer cover 1950 to be pulled through, which makes it possible for the cover to be pulled taut and to create the deep seam effect.

FIG. 22A and FIG. 22B show perspective views of the underside of the chair 1900 with the outer cover 1950 attached. FIG. 22C shows a cross-section of the chair 1900 with the outer cover 1950 attached. As shown in FIG. 22C, the internal flap 2040 fits through the thin opening 2140. The flaps 2010, 2020, 2030, and 2040 are pulled taut, and the attachment loops 2011, 2021, 2031, and 2041 are looped around grooved wheels 2210 disposed around the underframe 2200 of the chair.

In a variation of the third embodiment, the outer cover 1950 does not have an internal flap 2040 with two attachment loops 2041. In this variation, in order to create the appearance of a gap between the seat 1920 and backrest 1930, a semi-rigid material, such as a silicone rod, is sewn into the outer cover 1950 at the position corresponding to the deep seam 1940. When the outer cover 1950 is attached to the chair 1900, the semi-rigid material can be pushed into the deep seam 1940. The semi-rigid material is made to fit snugly in the deep seam 1940 so that it stays in place between the seat 1920 and backrest 1930. In some embodiments the deep seam 1940 may also have a corresponding track or channel created by semi-rigid material affixed to the seat panel, which may help keep the outer cover in place.

FOURTH EMBODIMENT

FIGS. 23 through 26 depict several views of a dining chair in a Scandinavian modern style.

FIG. 23 depicts a perspective view of the chair 2300. The chair comprises a chair body 2301, a back cushion 2302, and a seat cushion 2303. The cushions are removable from the chair body 2301 as described below.

FIG. 24 depicts a perspective view of the chair 2300 with back cushion 2302 and seat cushion 2303 detached. Backrest 2410 includes fastener parts 2411 and an alignment guide 2412, which may be in the form of a small indentation. Similarly, seat 2420 also includes several fastener parts 2421 and an alignment guide 2422.

FIG. 25 depicts a back view of the back cushion 2302 as removed from the chair body. The back cushion is covered by a removable and washable outer cover 2500 secured in place by an elastic band 2501. The back cushion 2302 has an arrangement of fastener parts 2511 that correspond and attach to the fastener parts 2411 on the backrest 2410 of the chair 2300. The fastener parts 2411 and 2511 are counterparts to each other, and may be, for instance, corresponding parts in a two-piece fastener such as a snap-in button and a button receptacle. Alignment guide 2512, which may be in the form of a small peg, fits into alignment guide 2412 on the backrest 2410.

FIG. 26 depicts a bottom view of the seat cushion 2303 as removed from the chair body. The seat cushion is covered by a removable and washable outer cover 2600 secured in place by an elastic band 2601. The underside of the seat cushion 2303 has an arrangement of fastener parts 2611 that correspond and attach to the fastener parts 2421 on the seat 2420 of the chair 2300 and an alignment guide 2612 that fits into alignment guide 2422 on the seat 2420.

As used in the above description and in the claims that follow, words such as "a," "an," and "the" include plural references unless the context clearly indicates otherwise. Also, as used in the description herein and throughout the claims that follow, the meaning of "in" includes "in" and "on" unless the context clearly indicates otherwise.

The above description illustrations various embodiments along with examples of how aspects of some embodiments may be implemented. These illustrations are not necessarily intended to limit the scope of the inventions described herein and as defined by the following claims. Based on the above disclosure and the following claims, other arrangements,

BRIEF DESCRIPTION OF DRAWINGS

FIGS. 19A and 19B depict perspective views of a chair in accordance with a third embodiment.

FIG. 20A depicts a perspective view of an outer cover that may be used with a chair in accordance with a third embodiment.

FIG. 22C depicts a cross-section of a chair in accordance with a third embodiment, in which the outer cover is attached to the chair.

FIG. 23 depicts a perspective view of a chair in accordance with a fourth embodiment.

FIG. 24 depicts a perspective view of a chair in accordance with a fourth embodiment, in which its back cushion and seat cushion have been removed.

Figure 1:
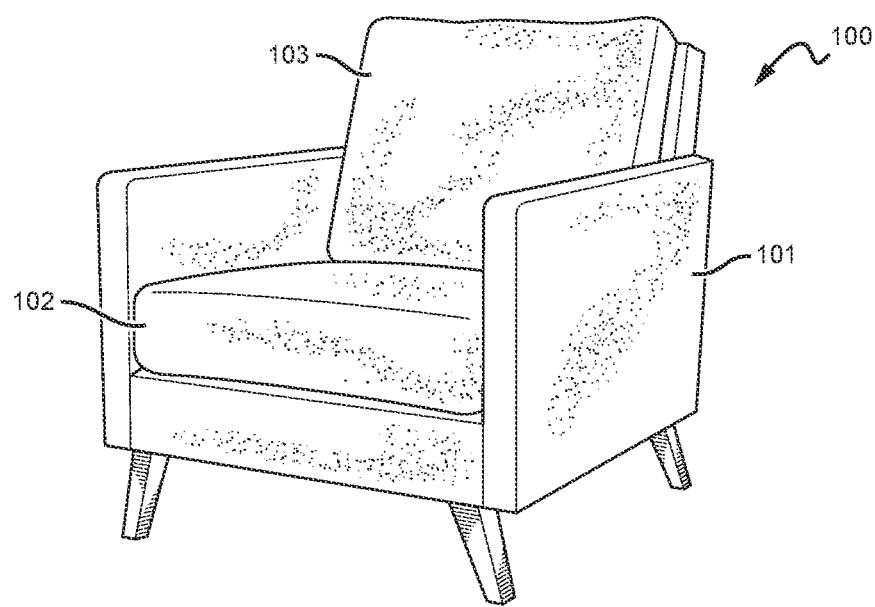
FIG. 1 depicts a perspective view of a chair in accordance with a first embodiment.
Figure 2:
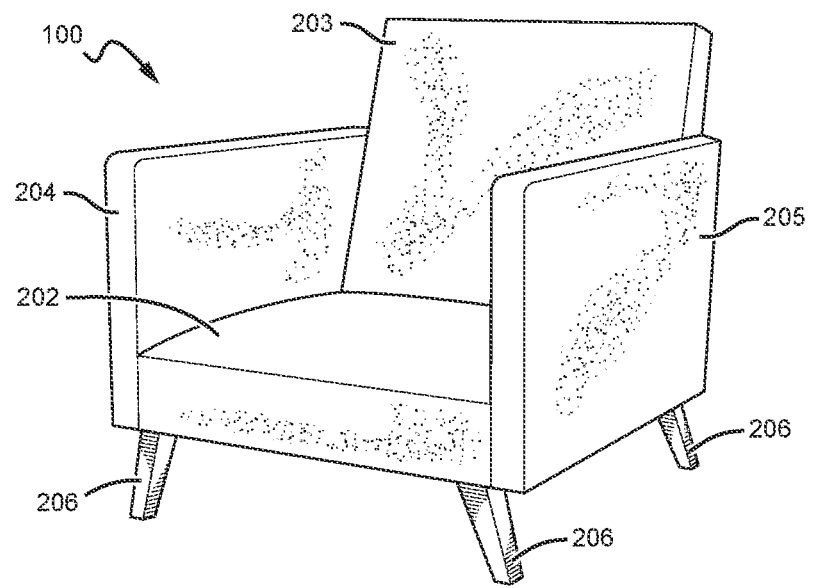
FIG. 2 depicts a perspective view of a chair in accordance with a first embodiment, in which the seat cushion and back cushion have been removed.
Figure 3A:
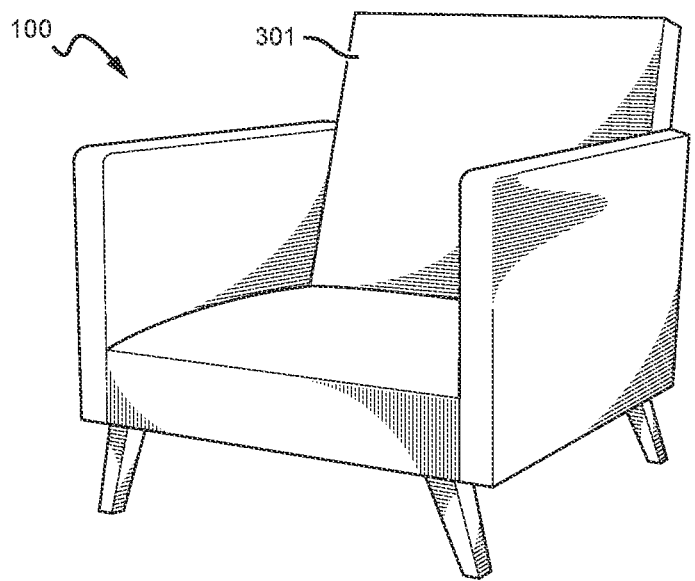
FIGS. 3A and 3B depict perspective views of a chair in accordance with a first embodiment, in which the chair's cushions and outer cover has been removed.
Figure 3B:
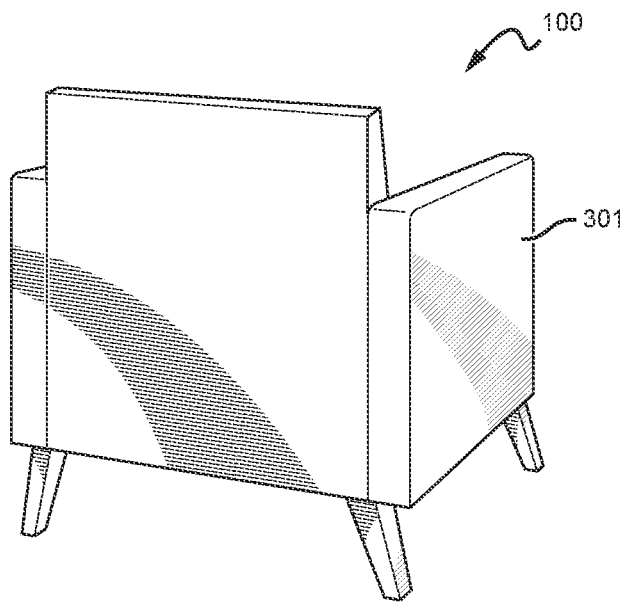
Figure 4A:
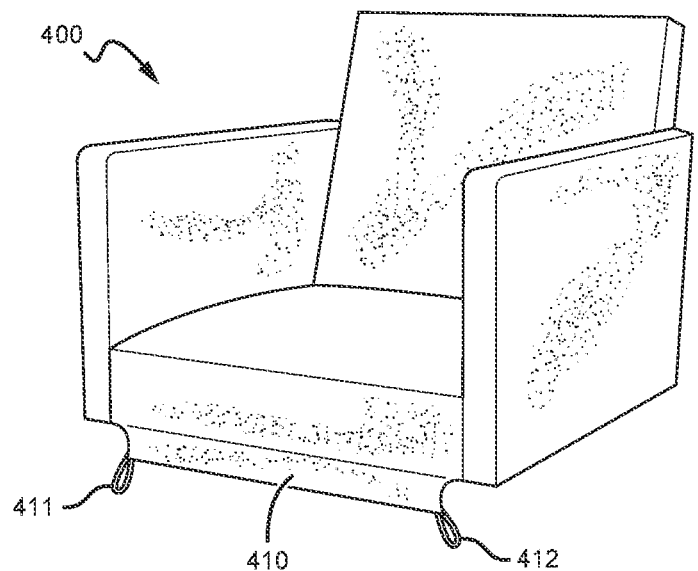
FIGS. 4A and 4B depict perspective views of an outer cover for a chair in accordance with a first embodiment.
Figure 4B:
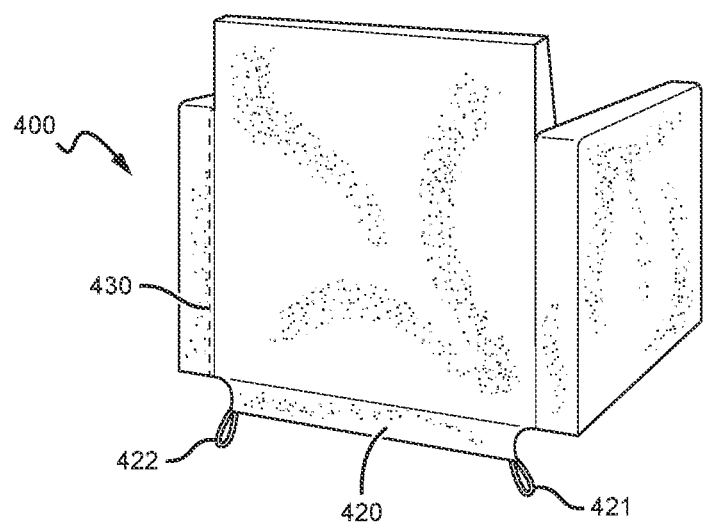
Figure 5:
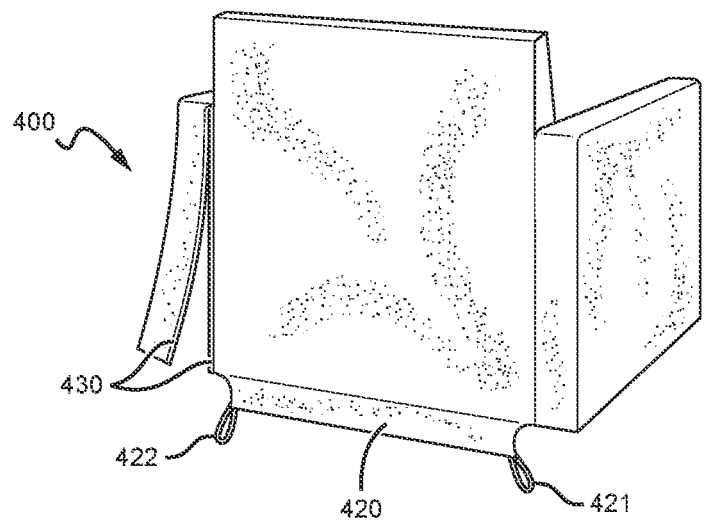
FIG. 5 depicts a perspective view of an outer cover for a chair in accordance with a first embodiment, in which the outer cover has been unzipped.
Figure 6:
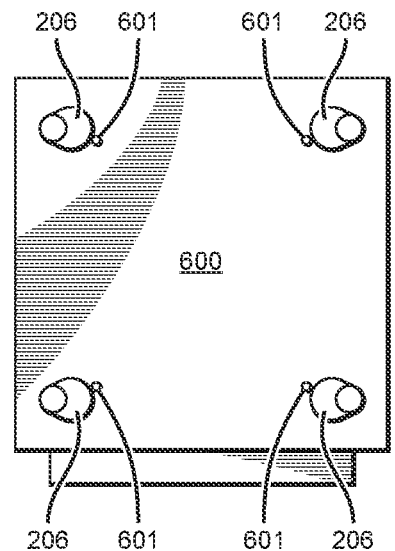
FIG. 6 depicts the underside of a chair in accordance with a first embodiment, in which the chair's outer cover has been removed.
Figure 7:
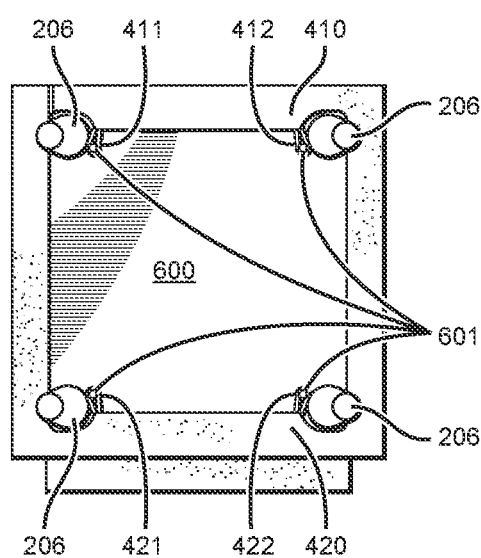
FIG. 7 depicts the underside of a chair in accordance with a first embodiment, in which the chair's outer cover is attached.
Figure 8A:
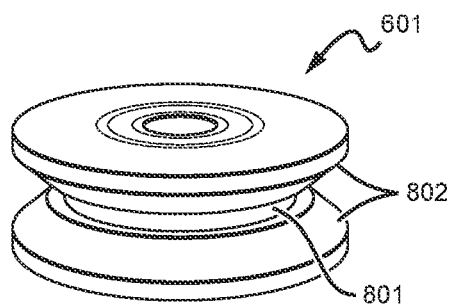
FIGS. 8A and 8B depict views of a grooved wheel that may be used as part of fastener to attach an outer cover to a chair.
Figure 8B:
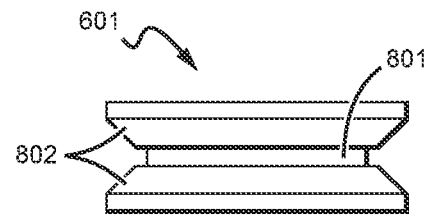
Figure 9A:
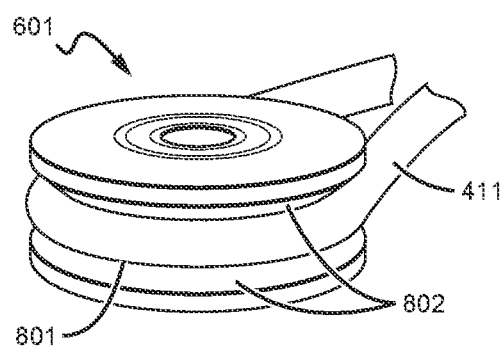
FIGS. 9A and 9B depict views of a grooved wheel with an attachment loop looped around it.
Figure 9B:
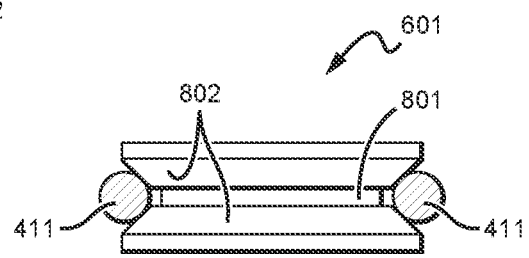
Figure 10A:
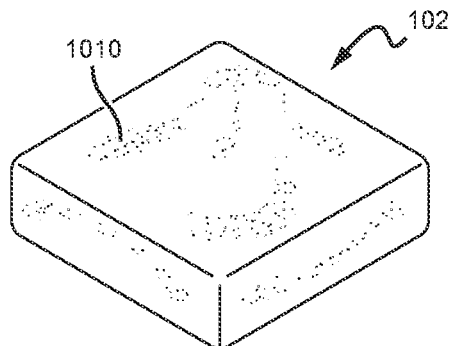
FIGS. 10A and 10B depict perspective views of a seat cushion.
Figure 10B:
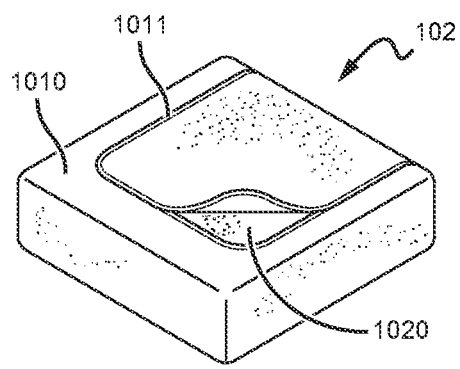
Figure 10C:
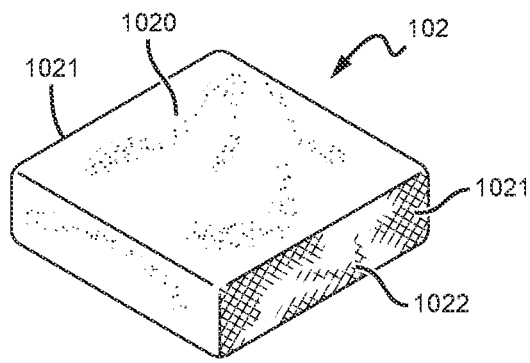
FIG. 10C depicts a perspective view of the seat cushion of FIGS. 10A and 10B, with its outer cover removed.
Figure 12A:
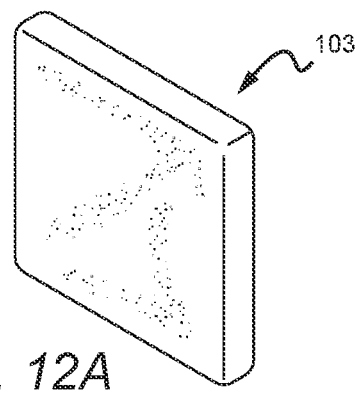
FIGS. 12A and 12B depict perspective views of a back cushion.
Figure 11:
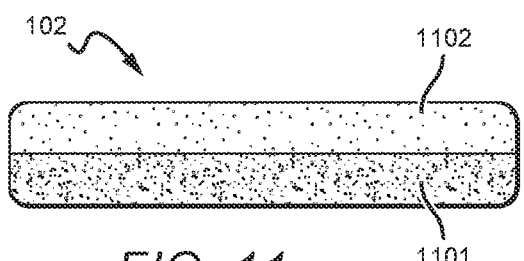
FIG. 11 depicts a side cross-section view of a seat cushion.
Figure 12B:
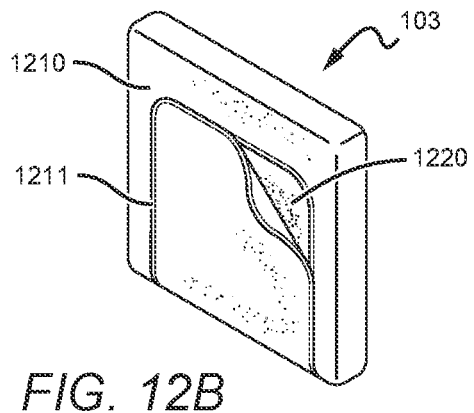
Figure 13:
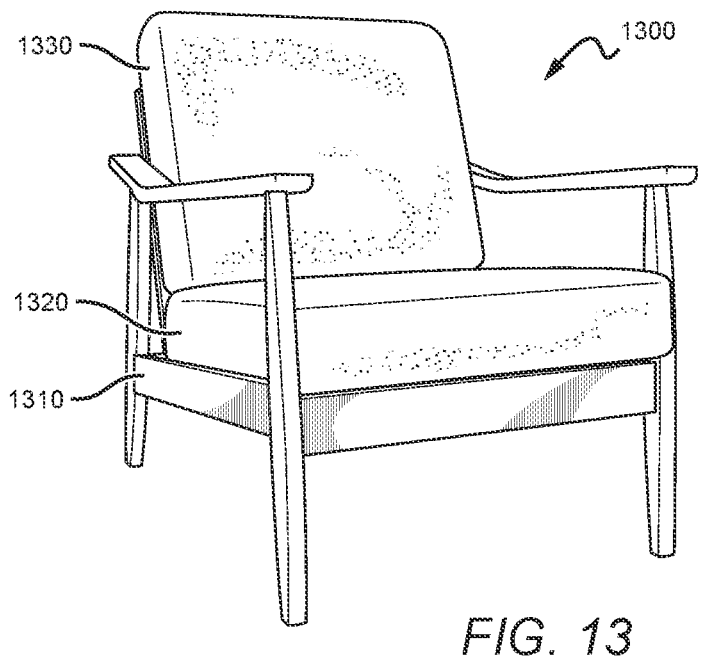
FIG. 13 depicts a perspective view of a chair in accordance with a second embodiment.
Figure 14:
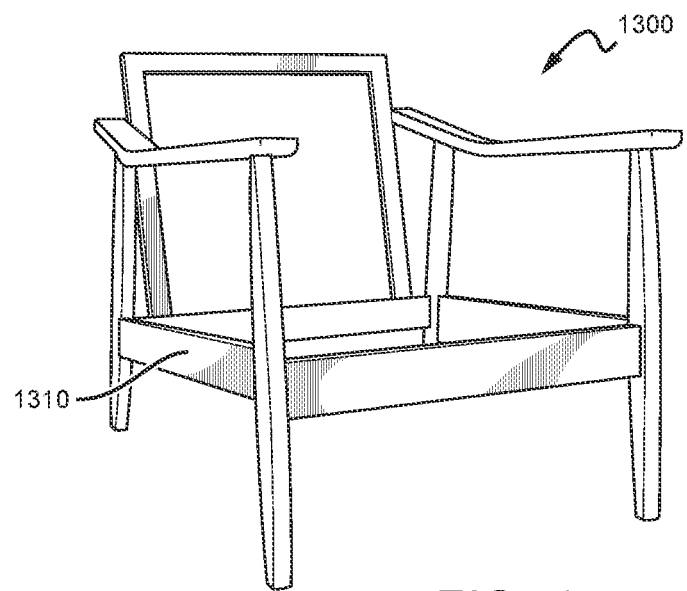
FIG. 14 depicts a perspective view of a chair in accordance with a second embodiment, in which the seat cushion and back cushion have been removed.
Figure 15A:
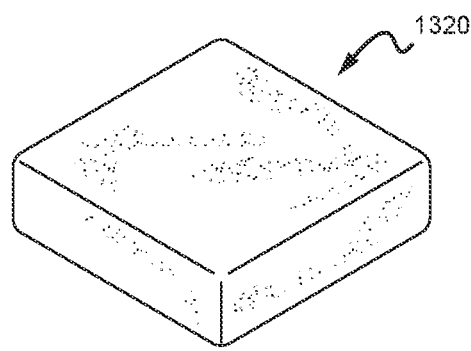
FIGS. 15A and 15B depict perspective views of a seat cushion.
Figure 15B:
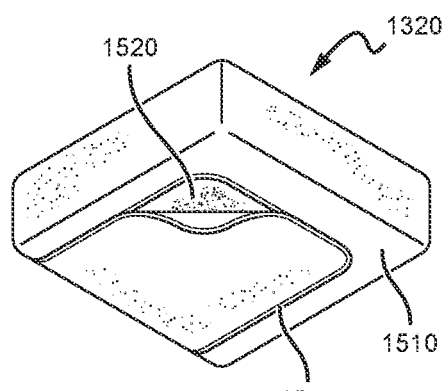
Figure 16A:
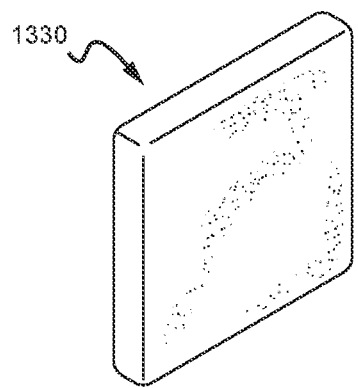
FIGS. 16A and 16B depict perspective views of a back cushion.
Figure 16B:
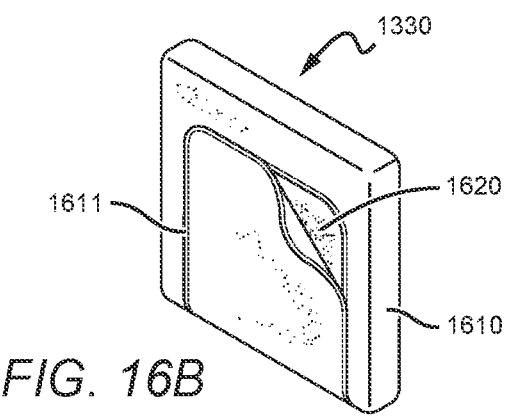
Figures 17, 18:
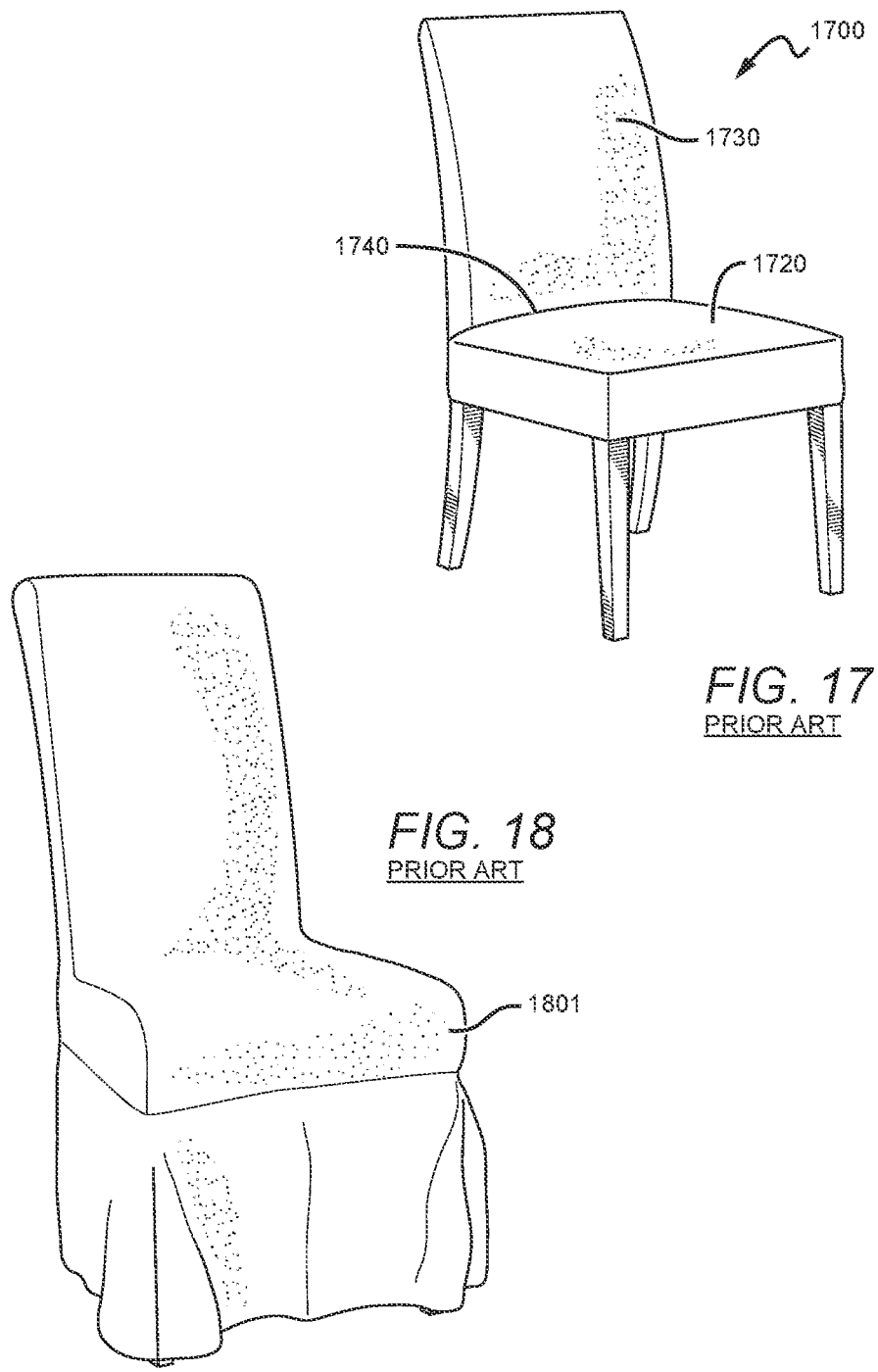
FIG. 17 depicts a perspective view of a conventional Parsons chair.
FIG. 18 depicts a perspective view of a conventional Parsons chair covered with a conventional slipcover.
Figure 20B:
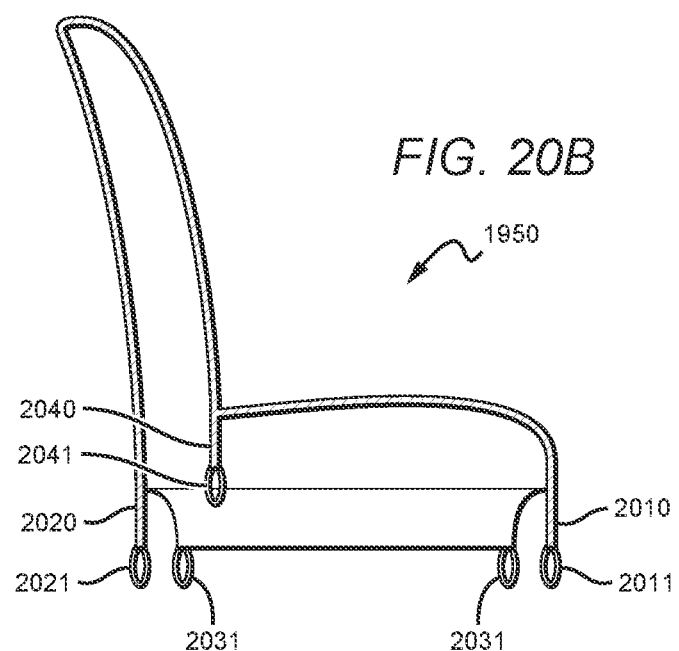
FIG. 20B depicts a side cross-section view of an outer cover that may be used with a chair in accordance with a third embodiment.
Figure 21:
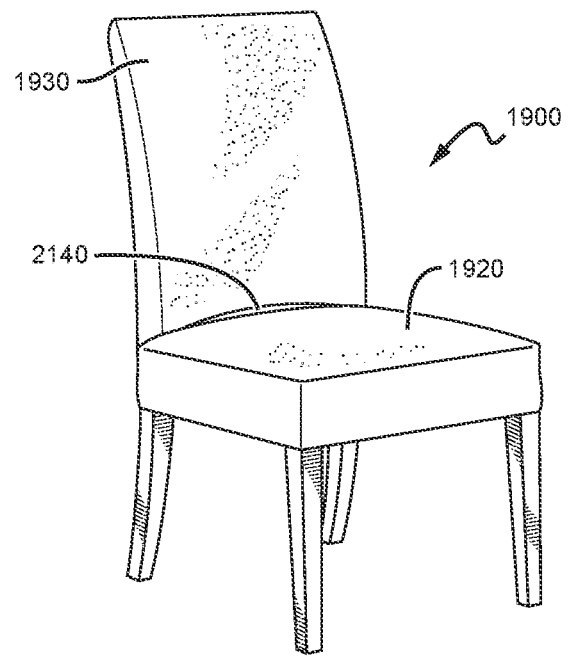
FIG. 21 depicts a perspective view of a chair in accordance with a third embodiment, in which the chair's outer cover has been removed.
Figure 22A:
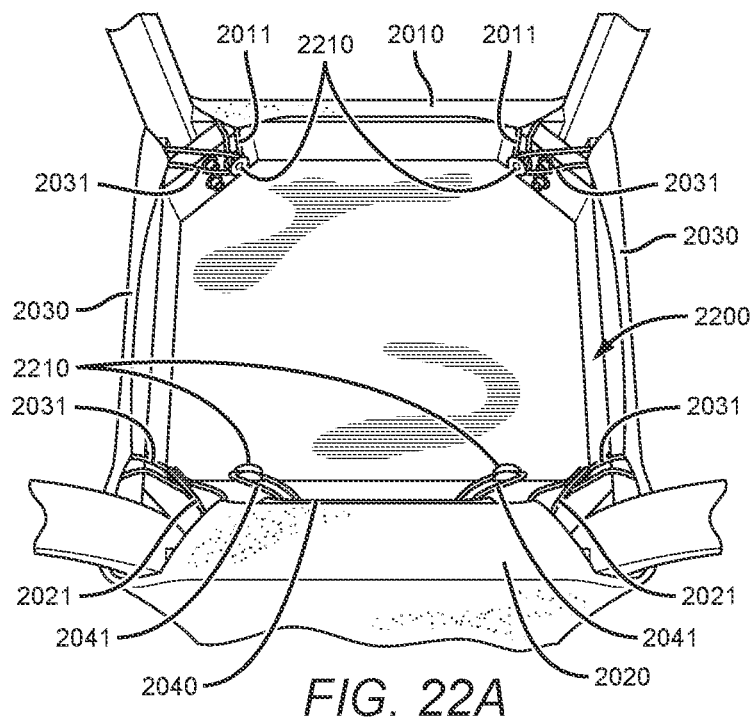
FIGS. 22A and 22B depict perspective views of the underside of a chair in accordance with a third embodiment, in which the outer cover is attached to the chair.
Figure 22B:
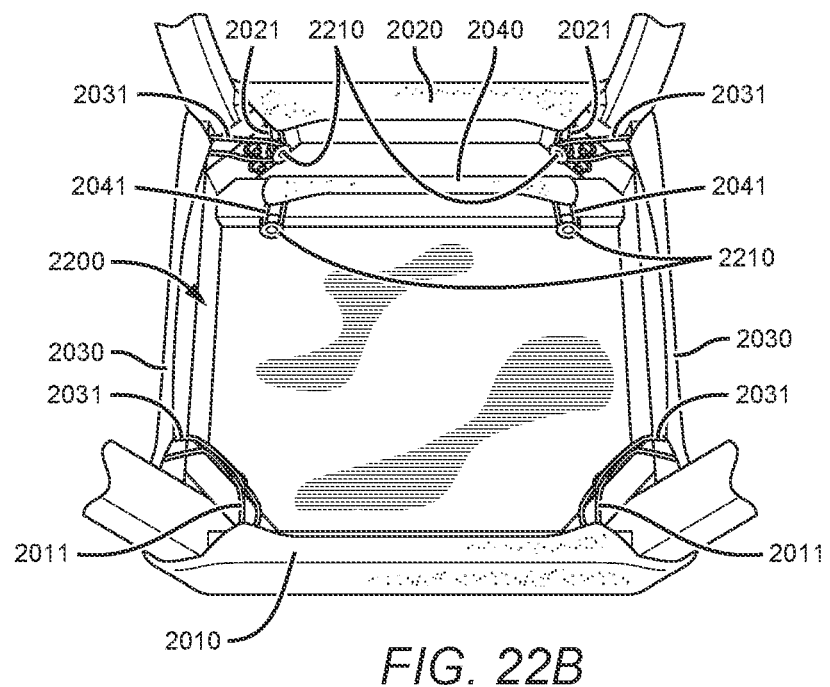
Figure 25:
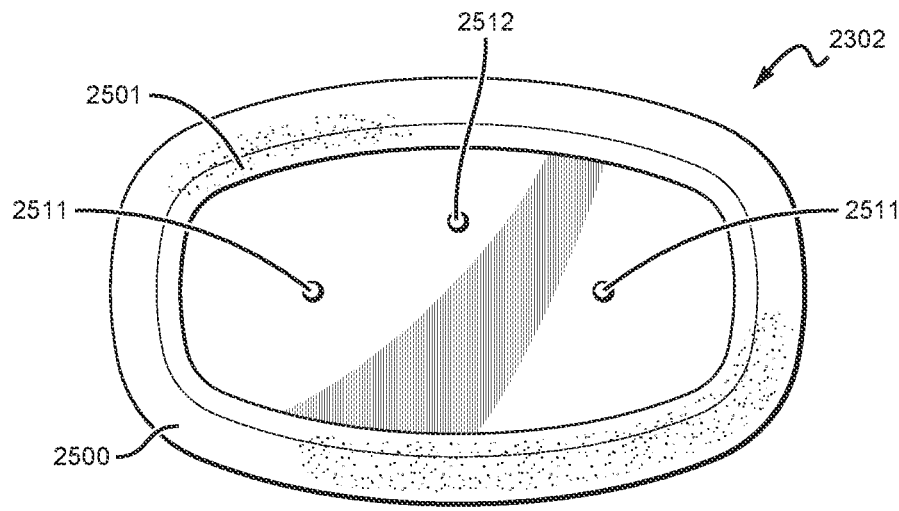
FIG. 25 depicts a back view of a back cushion that may be used with a chair in accordance with a fourth embodiment.
Figure 26:
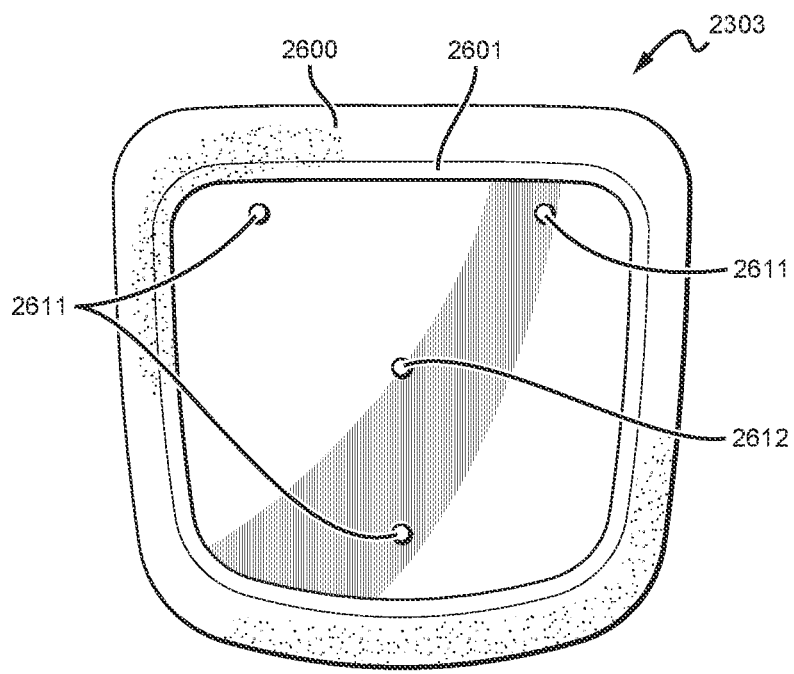
FIG. 26 depicts a bottom view of a seat cushion that may be used with a chair in accordance with a fourth embodiment.

The invention claimed is:

1. A chair, comprising:
a chair frame comprising a base, a back, and two arm rests, where said base, said back, and said two arm rests are cushioned, and wherein the base has an underside comprising one or more attachment points;
an inner cover non-removably attached to the chair frame; and
an outer cover removably attached to the chair frame;
wherein the outer cover fits snugly over the chair frame; and
wherein the outer cover comprises a front flap and a back flap, each flap having one or more attachment loops that engage with the one or more attachment points to secure the outer cover to the chair frame.

2. The chair of claim 1, wherein
at least one of the one or more attachment points is a grooved wheel comprising two outer flared portions and an inner groove portion, wherein at least one of the one or more attachment loops fits around the groove and is held in place by the flared portions;
the inner cover is made of a liquid-resistant material; and
the outer cover is made of a fabric material and further comprises a zipper to allow the outer cover to be opened for removal from the chair frame and to be closed to fit snugly over the chair frame.

3. A chair, comprising:
a chair frame comprising a base, a back, and two arm rests;
a seat cushion situated on the base of the chair frame; and
a back cushion situated against the back of the chair frame;
wherein at least one of the seat cushion and back cushion comprises a non-removable inner cover made of a liquid-resistant material and an outer cover made of a fabric material; and
wherein the outer cover comprises a u-zipper to allow the removal of the outer cover from the cushion.

4. A chair, comprising:
a chair frame comprising a cushioned backrest and a cushioned seat, wherein a deep seam is situated between the backrest and seat, creating an appearance of a visible gap between the backrest and seat, and wherein the seat has an underside comprising one or more attachment points;
an inner cover non-removably attached to the chair frame; and
an outer cover removably attached to the chair frame;
wherein the outer cover fits snugly over the chair frame; and
wherein the outer cover comprises one or more side flaps, each flap having one or more attachment loops that engage with the one or more attachment points to secure the outer cover to the chair frame.

5. The chair of claim 4, wherein
at least one of the one or more attachment points is a grooved wheel comprising two outer flared portions and an inner groove portion, wherein at least one of the one or more attachment loops fits around the groove and is held in place by the flared portions;
the inner cover is made of a liquid-resistant material; and
the outer cover is made of a fabric material.

6. The chair of claim 5, wherein
the chair frame further comprises an opening between the backrest and seat;
the outer cover further comprises an internal flap at a position corresponding to the position of the opening, wherein the internal flap can be pulled through the opening and has one or more internal attachment loops that engage with the one or more attachment points to create the appearance of a visible gap between the backrest and seat.

7. The chair of claim 5, wherein the outer cover further comprises a first semi-rigid material at a position corresponding to the position of the deep seam, wherein the semi-rigid material can be pushed into the deep seam and be held in place by the deep seam to create the appearance of a visible gap between the backrest and seat.

8. The chair of claim 7, wherein the deep seam further comprises a second semi-rigid material, wherein the first semi-rigid material and the second semi-rigid material engage with each other to hold the outer cover in place.

9. The chair of claim 8, wherein the first semi-rigid material and second semi-rigid material each compromises a silicone rod.

10. A chair, comprising:
a chair frame comprising a seat and a backrest;
a seat cushion removably attached to the seat; and
a back cushion removably attached to the backrest;
wherein at least one of the seat cushion and back cushion comprises a non-removable inner cover made of a liquid-resistant material and an outer cover made of a fabric material; and
wherein the outer cover comprises an opening lined with an elastic material to allow the removal of the outer cover from the cushion.

11. The chair of claim 10, wherein
the backrest comprises a first fastener part and a first alignment guide;
the back cushion comprises a second fastener part that attaches to the first fastener part and a second alignment guide that fits into the first alignment guide;
the seat comprises a third fastener part and a third alignment guide; and
the back cushion comprises a fourth fastener part that attaches to the third fastener part and a fourth alignment guide that fits into the third alignment guide.

* * * * *